United States Patent
Hasegawa

(10) Patent No.: US 10,363,809 B2
(45) Date of Patent: Jul. 30, 2019

(54) RADIATOR SCREEN DEVICE

(71) Applicant: KABUSHIKI KAISHA TOYOTA JIDOSHOKKI, Kariya-shi, Aichi-ken (JP)

(72) Inventor: Manabu Hasegawa, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 126 days.

(21) Appl. No.: 15/465,971

(22) Filed: Mar. 22, 2017

(65) Prior Publication Data

US 2017/0274759 A1    Sep. 28, 2017

(30) Foreign Application Priority Data

Mar. 24, 2016    (JP) .................................. 2016-059998

(51) Int. Cl.
  *B01D 46/00* (2006.01)
  *B60K 11/04* (2006.01)
  *B01D 46/10* (2006.01)
  *F28F 19/01* (2006.01)
  *B60K 11/08* (2006.01)

(52) U.S. Cl.
  CPC .......... *B60K 11/04* (2013.01); *B01D 46/0065* (2013.01); *B01D 46/0075* (2013.01); *B01D 46/10* (2013.01); *B60K 11/08* (2013.01); *F28F 19/01* (2013.01); *B60Y 2200/15* (2013.01); *F28F 2265/02* (2013.01)

(58) Field of Classification Search
  CPC .... B60K 11/04; B60K 11/08; F28F 19/00–06; F28F 2265/02; B60Y 2200/15; B01D 46/00; B01D 46/0065; B01D 46/0075; B01D 46/10
  USPC .................................................... 55/295–300
  See application file for complete search history.

(56) References Cited

U.S. PATENT DOCUMENTS

| | | | | |
|---|---|---|---|---|
| 2,236,986 A | * | 4/1941 | Beeman | F01P 7/10 160/11 |
| 2006/0005516 A1 | * | 1/2006 | Pikesh | B01D 46/0075 55/467 |

FOREIGN PATENT DOCUMENTS

| | | | |
|---|---|---|---|
| JP | 08-068326 A | | 3/1996 |
| JP | 08068326 A | * | 3/1996 |
| JP | 10-148126 A | | 6/1998 |
| JP | 2010-215199 A | | 9/2010 |

* cited by examiner

*Primary Examiner* — T. Bennett McKenzie
(74) *Attorney, Agent, or Firm* — Sughrue Mion, PLLC

(57) ABSTRACT

A radiator screen device for a construction machine, an agricultural machine, or an industrial vehicle, each having a vehicle body and a radiator, includes a screen to filter dust contained in cooling air flowing toward the radiator, and a dust removing member disposed upstream of the radiator with respect to a flowing direction of cooling air and movable relative to the screen in contact with a surface of the screen to remove dust attached to the screen. The dust removing member and the screen are supported by the vehicle body. One of the dust removing member and the screen is vibrated relative to the other of the dust removing member and the screen by vibration of the vehicle body.

4 Claims, 8 Drawing Sheets

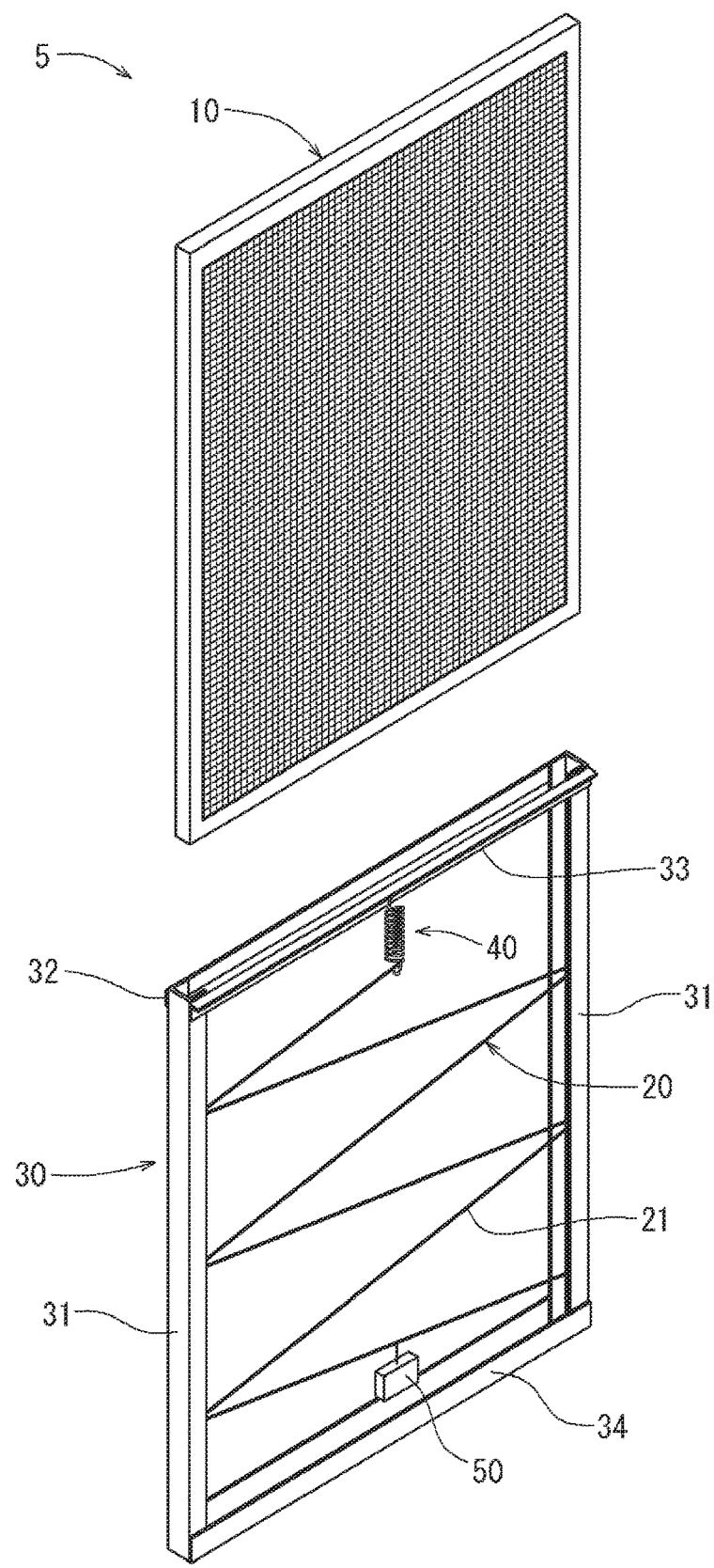

RADIATOR SCREEN DEVICE

BACKGROUND OF THE INVENTION

The present invention relates to a radiator screen device for use in various construction machines, agricultural machines, and industrial vehicles.

In various construction machines, agricultural machines, and industrial vehicles, a radiator screen is disposed in the front part of the engine radiator or on the upstream side of the engine radiator with respect to the flowing direction of cooling air toward the radiator, for filtering dust contained in the cooling air. If a large amount of dust is attached to the screen and the flow of cooling air through the radiator is disturbed, maintenance work is needed to remove the dust attached on the screen. Such screen maintenance work tends to be neglected for a long time. To solve such problem, various equipment has been proposed to remove dust attached to a screen automatically. For example, Japanese Patent Application Publication No. 2010-215199 discloses a device having a screen with a brush that is provided on the front surface thereof to remove dust. In maintenance of the screen of the device, the dust attached to the screen is removed by moving the brush.

The device of the above Publication has an actuator to move the brush. The device becomes costly in that the actuator needs and consumes energy for operating the actuator.

The present invention which has been made in light of the above problems is directed to providing a radiator screen device for use in various construction machines, agricultural machines, and industrial vehicle, that includes a screen that filters dust contained in cooling air for a radiator and a dust removing member that removes dust attached to the screen, in which the dust attached to the screen is removed by relative movement of the screen and the dust removing member without using any additional actuator.

SUMMARY OF THE INVENTION

In accordance with one aspect of the present invention, there is provided a radiator screen device for a construction machine, an agricultural machine, or an industrial vehicle, each having a vehicle body and a radiator. The radiator screen device includes a screen to filter dust contained in cooling air flowing toward the radiator, and a dust removing member disposed upstream of the radiator with respect to a flowing direction of cooling air and movable relative to the screen in contact with a surface of the screen to remove dust attached to the screen. The dust removing member and the screen are supported by the vehicle body. One of the dust removing member and the screen is vibrated relative to the other of the dust removing member and the screen by vibration of the vehicle body.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which:

FIG. 9 is a perspective view similar to FIG. 5, showing a radiator screen device according to a third embodiment of the present invention.

DETAILED DESCRIPTION OF THE EMBODIMENTS

Figure 1:
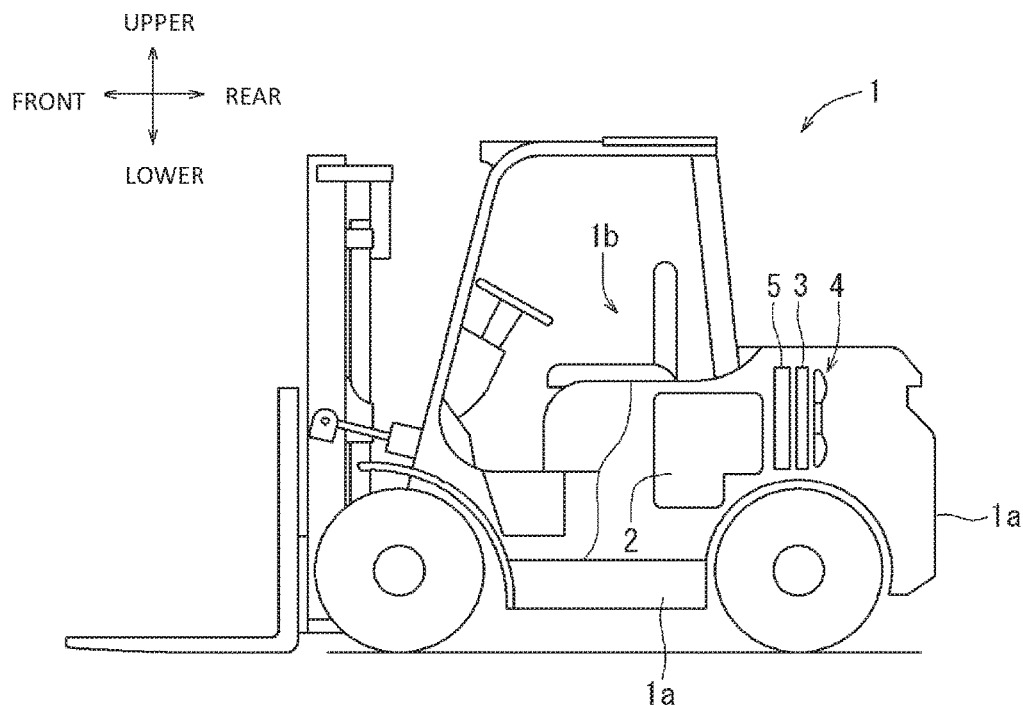
FIG. 1 is a schematic side view of a forklift truck having a radiator screen device according to a first embodiment of the present invention.

The following will describe a radiator screen device of a forklift truck 1 as an industrial vehicle according to a first embodiment of the present invention with reference to FIGS. 1 to 6. Double-headed arrows shown in the respective drawings indicate various directions associated with the forklift truck 1 or a radiator screen device according to the respective embodiments mounted on the forklift truck 1. The following descriptions concerning directions are based on the above directions indicated by the arrows in the drawings.

As shown in FIG. 1, the forklift truck 1 includes an engine 2, a seat 1b, and a radiator 3 for cooling coolant water of the engine 2. The engine 2 of the forklift truck 1 is disposed below and rearward of the seat 1b. The radiator 3 is disposed further rearward of the engine 2 than the seat 1b. A cooling fan 4 is disposed rearward of the radiator 3 and rotated so as to produce a rearward air flow through the radiator 3. The cooling fan 4 is operatively connected to the engine 2 for rotation with the engine 2. Specifically, though not shown in the drawing, a rotary shaft of the cooling fan 4 is connected to an output shaft of the engine 2 through a belt. It is noted that according to the present invention the cooling fan 4 may be disposed forward of the radiator 3.

Figure 4:
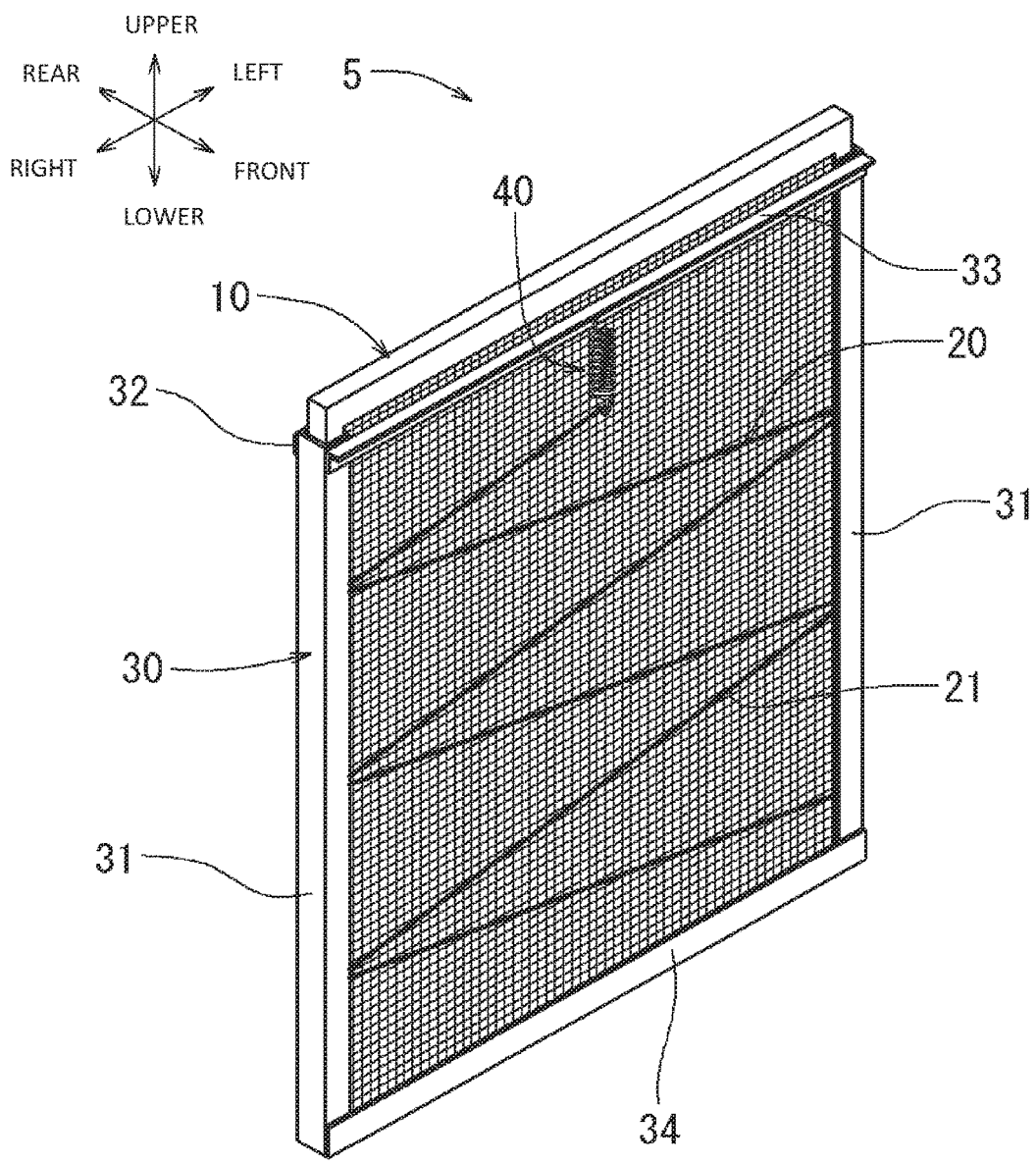
FIG. 4 is a perspective view of the radiator screen device of FIG. 2.
Figure 5:
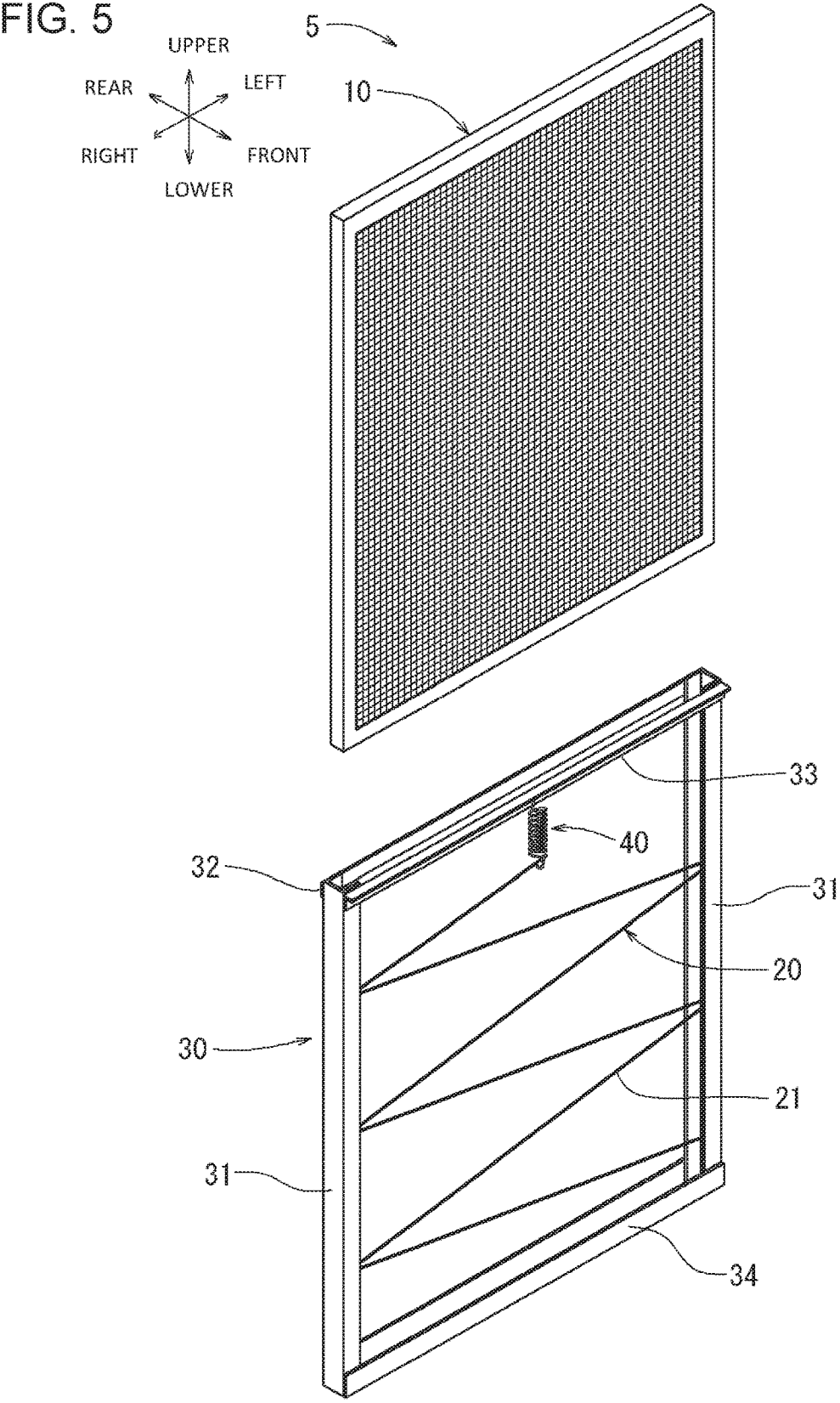
FIG. 5 is a perspective view of the radiator screen device of FIG. 2, showing a state in which a screen is removed from a frame body.

A screen device 5 is disposed forward of the radiator 3, or upstream of the radiator 3 with respect to the flowing direction of cooling air. As shown in FIGS. 4 and 5, the screen device 5 includes a frame body 30 and a wire-woven screen 10 mounted in the frame body 30 and functions to filter dust contained in cooling air. The screen 10 may be removed out from the frame body 30 for maintenance. The screen 10 has a mesh size of, for example, six millimeters, so that dust which is larger than the mesh size is filtered by the screen 10. The dust includes wood and bark debris. According to the present invention, however, the screen and the dust are not limited to the above mesh size, wood, and bark debris.

The engine 2, the radiator 3, the cooling fan 4, and the screen device 5 are mounted on a vehicle body 1a as a framework member of the forklift truck 1 (FIG. 2), so that vibration produced in the vehicle body 1a while the forklift truck 1 is traveling is transmitted to the screen device 5.

Vibration of a greater magnitude tends occur when the forklift truck 1 travels on an irregular floor surface, turns in either direction, accelerates or decelerates its speed, and performs loading or carrying operation.

Figure 6:
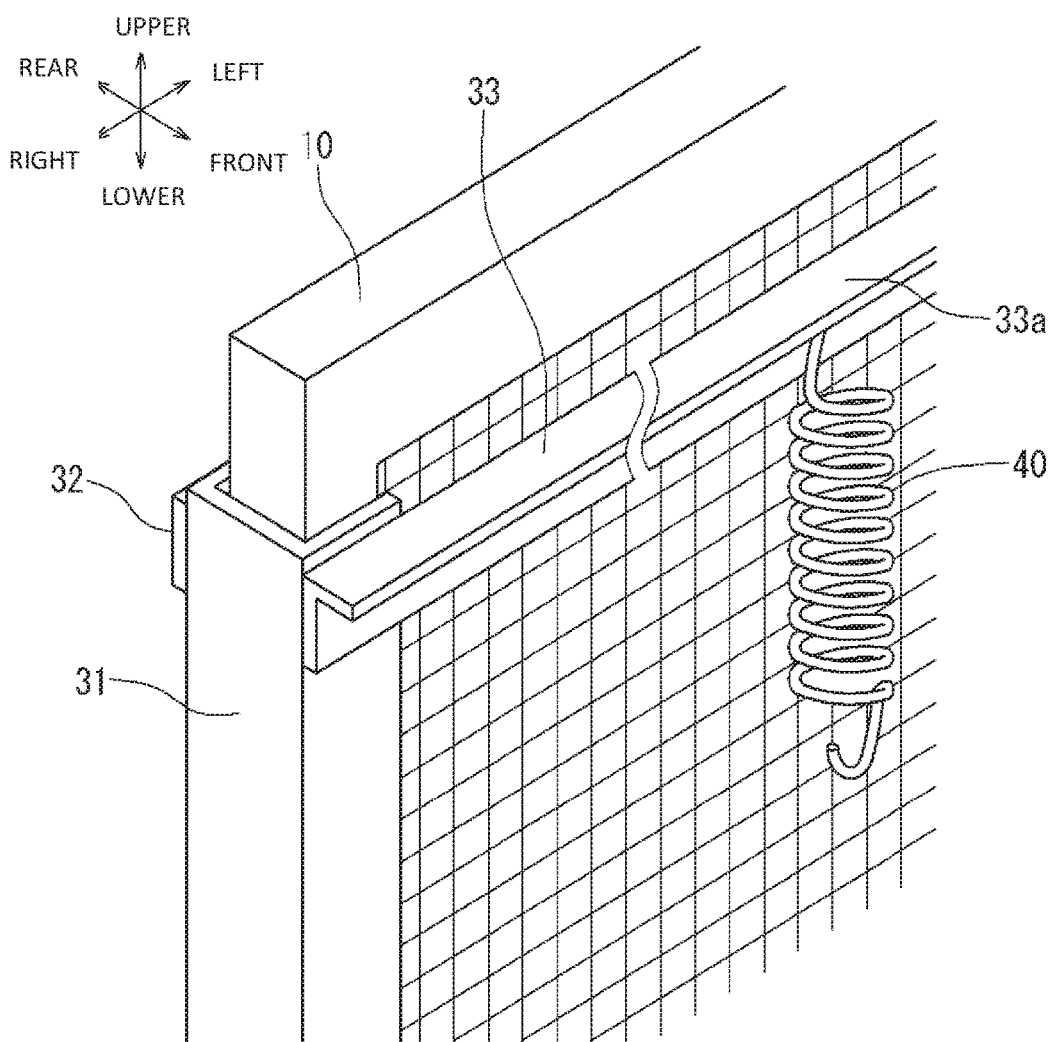
FIG. 6 is a fragmentary enlarged perspective view of the radiator screen device of FIG. 2.

As shown in FIGS. 4 to 6, the frame body 30 of the screen device 5 includes a pair of side frames 31, a pair of upper frames 32, 33, and a pair of lower frames 34 (only one lower frame being shown in the drawings) which are connected together into the frame body 30 of a rectangular shape. Specifically, the side frames 31 have a U-shape in cross section and are disposed with their opened sides facing each other for receiving therein the screen 10. The upper frame 32 has a plate shape. The upper frame 33 has an L-shape in section and includes a flange portion 33a. The opposite ends of the upper frame 33 are connected to the upper ends of the side frames 31, respectively, on the front side thereof, with the flange portion 33a projecting forward. The opposite ends of the upper frame 32 are also connected to the upper ends of the side frames 31, respectively, on the rear side thereof. The lower frames 34 have a plate shape. The opposite ends of the lower frames 34 are connected to the bottom ends of the side frames 31, respectively.

The upper frame 33 has at the longitudinal center thereof a coil spring 40 that corresponds to the elastic member of the present invention. The upper end of the coil spring 40 is fixed to the lower part of the flange portion 33a of the front upper frame 33 and the bottom end of the coil spring 40 is fixed to the upper end of a dust removing member 20. The dust removing member 20 is made of a wire 21 that has a zigzag shape. Vibration of the vehicle body 1a is transmitted to the frame body 30, which causes the coil spring 40 that hangs from the frame body 30 to be vibrated vertically. The coil spring 40 and the wire 21 cooperate to form a vibrating system and the wire 21 serves as a mass of the vibrating system.

The dust removing member is easily vibrated by the elastic member and, therefore, dust attached to a screen may be removed effectively by vibration of a vehicle body. The dust removing member is made of a wire that has a simple zigzag shape to remove dust in a broad range of a screen.

The wire 21 is mounted in the frame body 30 with the sharp turn portions of the zigzag on the right and left sides thereof fixedly inserted in the U-shaped side frames 31 so that the wire 21 is movable only vertically in the frame body 30. That is, lateral movement of the wire 21 is prevented by the sharp turn portions of the zigzag shape of the wire 21 fixed in the side frames 31. In operation of the engine 2, the wire 21 is pressed in contact with the surface of the screen 10 by wind pressure from the cooling fan. According to the present invention, the coil spring 40 may be configured to elastically support the wire 21 at the lower part of the coil spring 40.

That is, when the dust removing member is vibrated by vibration of a vehicle body, a region in which the dust moving member is movable is regulated within the surface of the screen by the frame body. Therefore, the dust removing member performs effectively by suppressing useless movement thereof.

Figure 2:
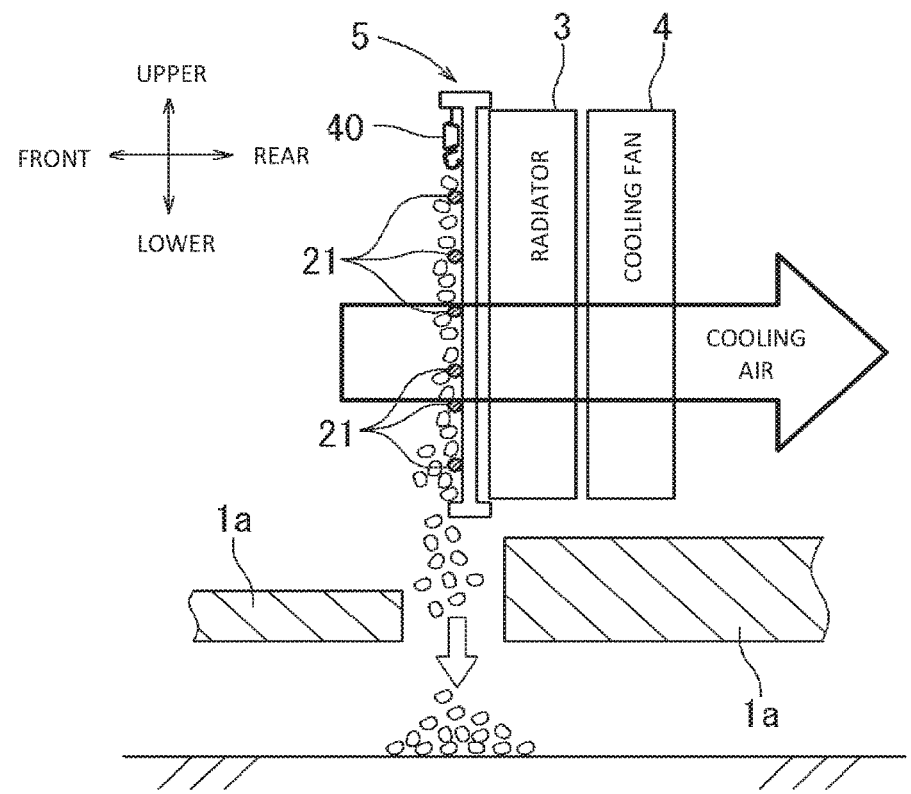
FIG. 2 is an enlarged schematic side view of the radiator screen device according to the first embodiment, showing how dust is removed.
Figure 3:
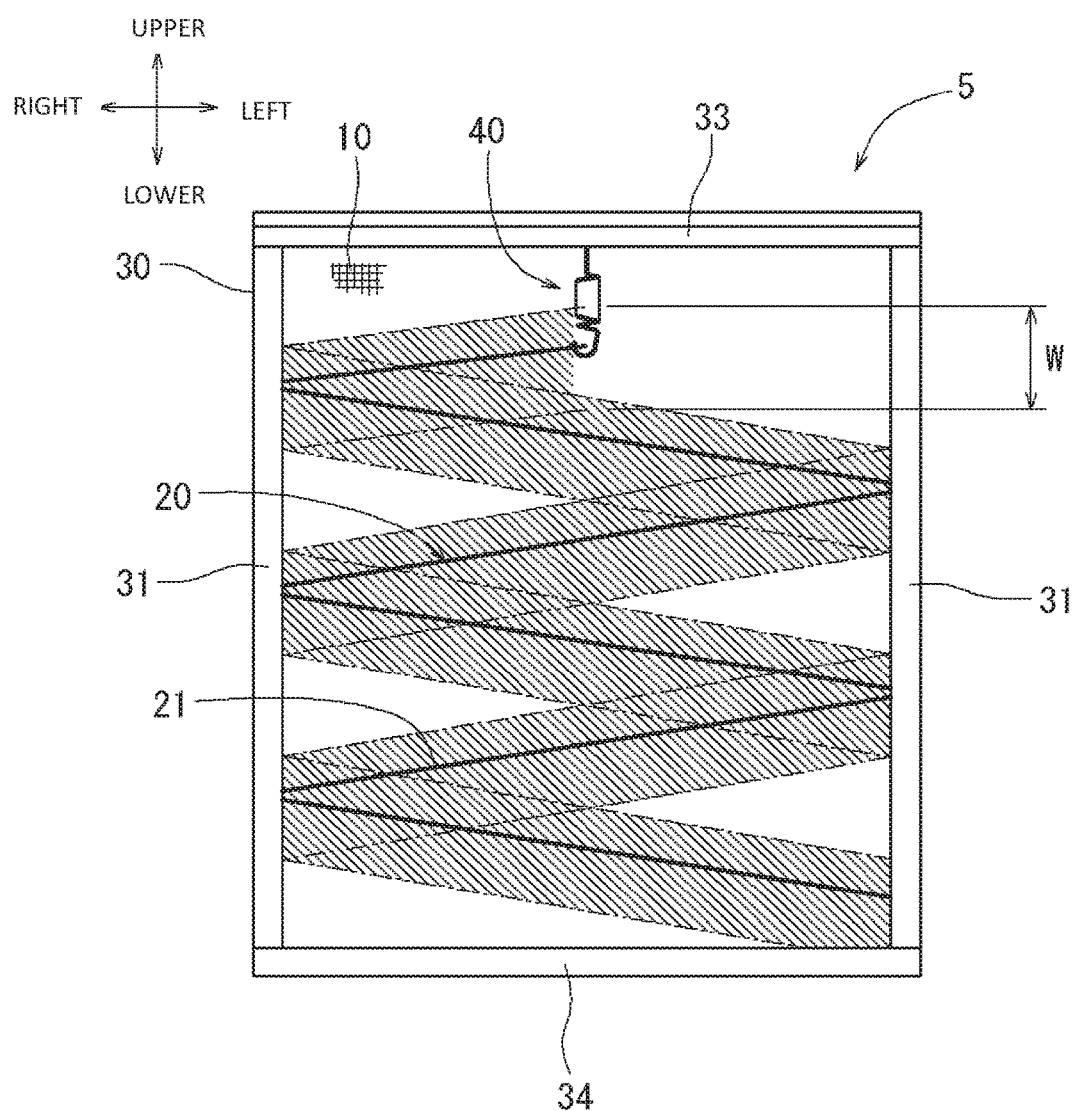
FIG. 3 is a front view of the radiator screen device of FIG. 2.

During the travelling or loading operation of the forklift truck 1, the coil spring 40 is vibrated vertically by the vibration of the vehicle body 1a with the wire 21 placed in pressing contact with the surface of the screen 10. Thus, of the dust attached to the surface of the screen 10, the dust in the region where the vibrating wire 21 sweeps is moved outside the region. The region indicated by hatching in FIG. 3 shows the region where the dust is removed when the wire 21 vibrates vertically by the width W. Part of the dust thus moved out of the region is dropped from the surface of the screen 10 (FIG. 2). As a result, the resistance of the screen 10 against air flow is reduced and an increased volume of cooling air flows through the radiator 3.

In above-described first embodiment, the wire 21 of the screen device 5 vibrates on the surface of the screen 10 by the vibration of the vehicle body 1a, with the result that part of the dust attached to the screen 10 can be removed. The screen device 5 of such a structure needs no additional actuator to cause the wire 21 as the dust removing member 20 to vibrate and permits to remove the dust attached to the screen 10 by using the vibration energy of the vehicle body 1a. The use of the wire 21 as the dust removing member 20 that offers less air resistance helps to reduce the air flow resistance helps to reduce the air flow resistance of the screen 10.

Figure 7:
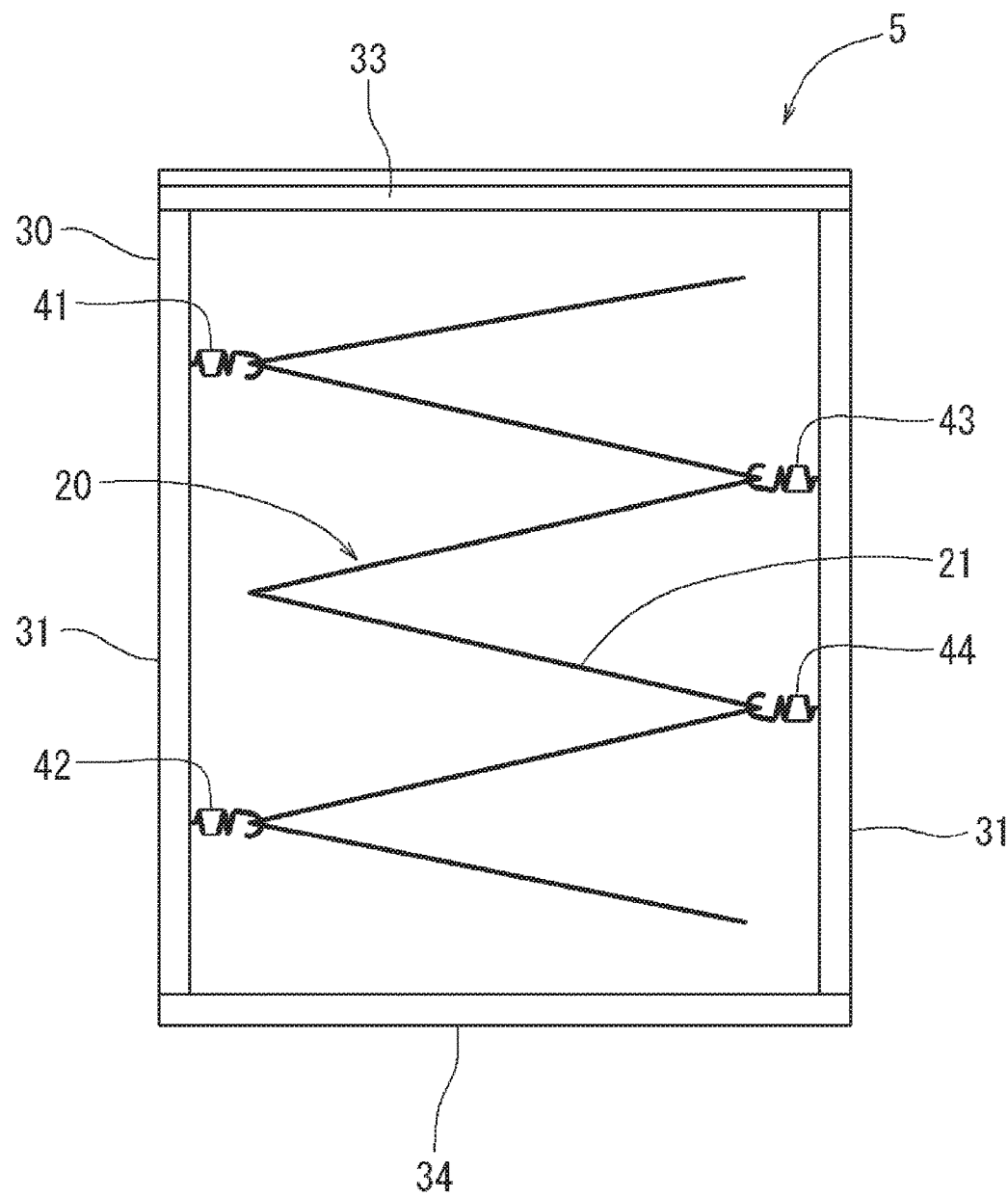
FIG. 7 is a front view similar to FIG. 3, showing a radiator screen device according to a second embodiment of the present invention.
Figure 8:
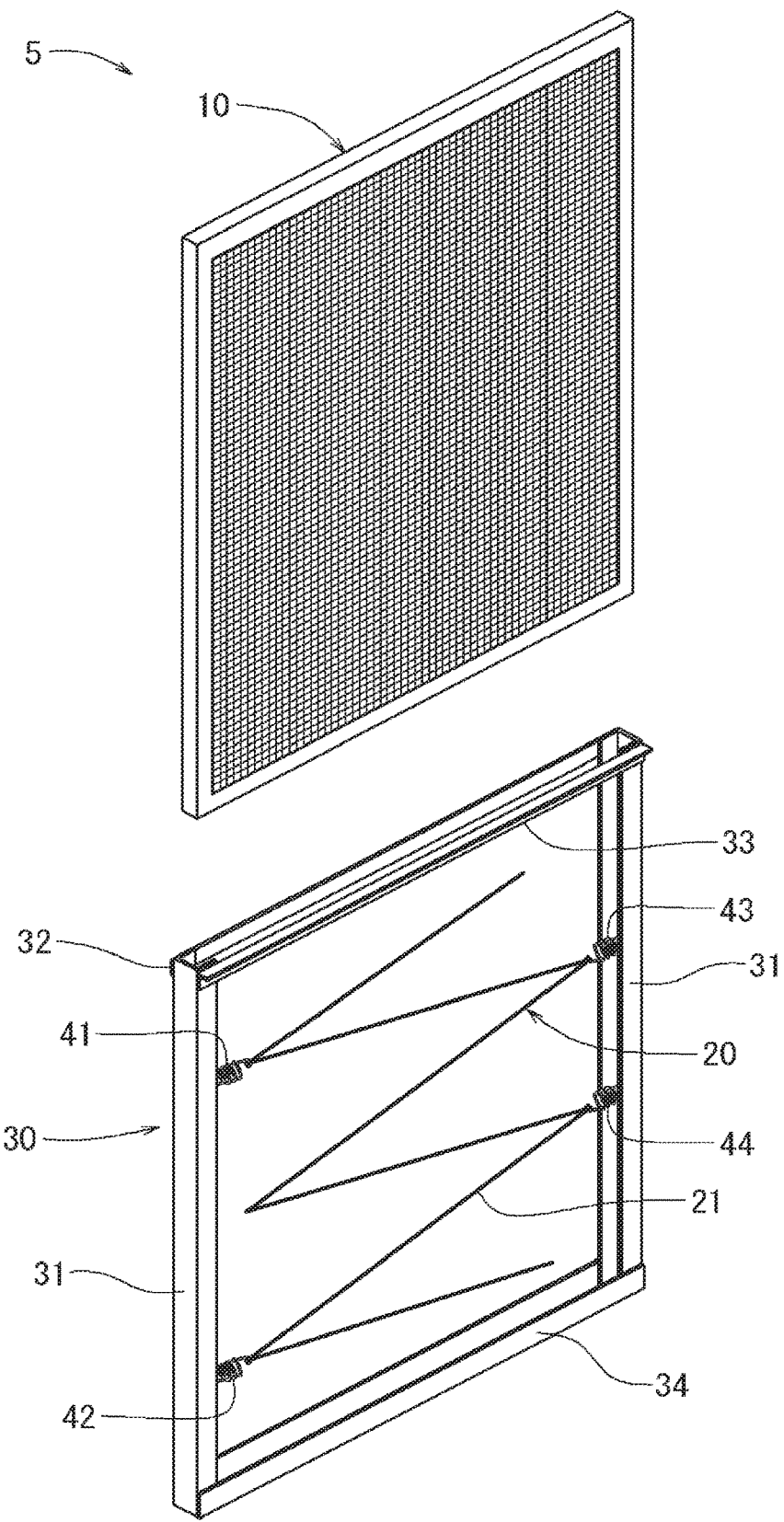
FIG. 8 is a perspective view similar to FIG. 5, showing the radiator screen device of FIG. 7.

The following will describe a radiator screen device of the forklift truck 1 as an industrial vehicle according to a second embodiment of the present invention with reference to FIGS. 7 and 8. The second embodiment differs from the first embodiment in that the wire 21 is supported by four coil springs 41, 42, 43, 44 that are fixed to the frame body 30. The rest of the structure is substantially the same as that of the first embodiment. Common or similar parts or elements are designated by the same reference numerals as those used in the description of the first embodiment and, therefore, the description thereof will be omitted and the modifications will be described.

As shown in FIGS. 7 and 8, the coil springs 41, 42 are fixed to the right side frame 31 with the coil spring 41 disposed above the coil spring 42. The coil springs 43, 44 are fixed to the left side frame 31 with the coil spring 43 disposed above the coil spring 44. The coil springs 41, 42 and the coil springs 43, 44 are disposed in facing relation to each other. The coil springs 41 to 44 support the wire 21 at the sharp turn portions on the right and left sides of the zigzag shape of the wire 21, respectively. According to the present invention, it may be so configured that the coil springs support the wire 21 at points in the upper and lower frames 33, 34 as long as the wire 21 is supported securely from the periphery of the frame body 30.

The wire 21 is provided without interfering with the frame body 30 and, therefore, the movement of the wire 21 is not regulated by the frame body 30, so that the wire 21 is vibrated in various directions in response to the vibration of the frame body 30 transmitted from the vehicle body 1a. Specifically, when the frame body 30 is vibrated in vertical, horizontal, or oblique direction, the wire 21 is vibrated in the same direction as the frame body 30.

The vibration of the wire 21 due to the vibration of the vehicle body 1a, removes the dust attached to the surface of the screen 10, so that the resistance of the screen 10 against the flow of air is reduced as in the first embodiment. In this case, the dust on the surface of the screen 10 in a region where the wire 21 sweeps due to its vibration in various directions may be removed. In the second embodiment in which the frame body 30 and hence the wire 21 are vibrated in lateral as well as vertical directions in accordance with the vibration of the vehicle body 1a, the wire 21 may remove dust effectively. In the case that the vehicle body 1a vibrates mainly vertically and vibrates less in lateral direction, the radiator screen device according to the first embodiment may be used. The structure of the second embodiment in which four coil springs 41 to 44 are used to support the wire 21 allows the wire 21 to be vibrated sufficiently even if the wire 21 is relatively heavy.

The following will describe a radiator screen device according to a third embodiment of the present invention with reference to FIG. 9. The third embodiment differs from the first embodiment in that a weight 50 is fixed to the lower part of the wire 21. The rest of the structure is substantially the same as that of the first embodiment. Common or similar parts or elements are designated by the same reference numerals as those used in the description of the first embodiment and, therefore, the description thereof will be omitted and the modifications will be described.

The weight 50 is fixed to the center of the lower part of the wire 21 and hangs from the wire 21. The vibration of the frame body 30 from the vehicle body 1a is transmitted to the weight 50 through the wire 21, so that the weight 50 vibrates with the wire 21 vertically. In this case, the wire 21 and the weight 50 can be considered as a mass hanging from the coil spring 40 and cooperate to form a vibration system. The structure in which the weight 50 is fixed to the wire 21 allows the wire 21 and the weight 50 to be vibrated to a greater extend when the vibration frequency of the vehicle body 1a is relatively low. The wire 21 moving on the screen 10 due to its vibration removes dust on the surface of the screen 10 as in the first embodiment. The position where the weight 50 is fixed to the wire 21 is not limited to the lower part of the wire 21. A plurality of weights such as 50 may be provided. The weights such as 50 may have various shapes.

In the third embodiment in which the dust removing member 20 includes the wire 21 and the weight 50 fixed to the lower part of the wire 21, the weight 50 helps to increase the weight of the dust removing member 20. In the case of a forklift truck 1 that is operated with a relative low vibration frequency, the dust removing member 20 may be used advantageously because it is vibrated to a greater extent thereby to remove dust on the surface of the screen 10 effectively. By changing the weight 50 in accordance with the spring constant of the coil spring 40, the wire 21 and the weight 50 may be made to resonate with the vibration of the vehicle body 1a. In this case, the wire 21 and the weight 50 may vibrate with a greater amplitude and for a longer time.

The present invention is not limited to the above-described embodiments, but may be modified into various alternative embodiments, as exemplified below.

(1) A radiator screen device according to the present invention may be used for various construction machines, agricultural machines, and industrial vehicles as well as a forklift truck.

(2) A radiator screen device according to the present invention may be configured so that the wire 21 is fixed to the frame body 30 and the screen 10 may be vibrated relative to the frame body 30. A radiator screen device according to the present invention may be configured so that the screen 10 and the wire 21 are vibrated with different vibration frequencies so that relative vibration occurs in the screen 10 and the wire 21.

(3) A radiator screen device according to the present invention may be configured so that the sharp turns of the zigzag shape of the wire 21 as the dust removing member 20 may be replaced with a wave shape or a rectangular strip shape.

(4) A radiator screen device according to the present invention may be configured so that the wire 21 as the dust removing member 20 has a spiral shape or is formed of a material that may be shaped in any desired shape according to the conditions in which the radiator screen device is actually used.

(5) A radiator screen device according to the present invention may be configured so that the screen 10 is made of a mesh, a perforated plate or a filter and the dust removing member 20 is made of a spring wire, a brush, a mesh or a perforated plate. The materials of the screen 10 and the dust removing member 20 may be selected based on a type of dust and how a vehicle or a machine mounting the screen 10 and the dust removing member 20 is used.

(6) A radiator screen device according to the present invention may be configured so that the elastic member may be separated to more than two members. The elastic member may be made of a plate spring, an air spring, or rubber.

What is claimed is:

1. A radiator screen device for a construction machine, an agricultural machine, or an industrial vehicle, each having a vehicle body and a radiator, comprising:
    a screen to filter dust contained in cooling air flowing toward the radiator, and that includes a front surface and a rear surface;
    a dust removing member disposed upstream of the radiator with respect to a flowing direction of the cooling air and movable relative to the screen, and disposed in contact with the front surface of the screen to remove dust attached to the front surface of the screen; and
    a frame body that surrounds the dust removing member,
    wherein the dust removing member comprises a wire that has a zigzag shape so as to be placed in contact with the surface of the screen,
    wherein the front surface of the screen is disposed upstream of the rear surface of the screen with respect to the flowing direction of the cooling air,
    wherein the frame body is brought into contact with the dust removing member to regulate a movable range of the dust removing member within the frame body, and
    wherein the dust removing member and the screen are supported by the vehicle body, and wherein one of the dust removing member and the screen is vibrated vertically relative to the other of the dust removing member and the screen by vibration of the vehicle body.

2. The radiator screen device according to claim 1, wherein the dust removing member is supported by the vehicle body through an elastic member, and wherein the dust removing member and the elastic member cooperate to form a vibrating system and the dust removing member serves as a mass of the vibrating system.

3. The radiator screen device according to claim 1, wherein the radiator screen device includes a weight that is fixed to the dust removing member, and wherein the weight is configured to affect the vibration of the dust removing member by vibration of the vehicle body.

4. The radiator screen device according to claim 1, wherein the wire is vibrated vertically relative to the screen to remove the dust attached to the front surface of the screen.

* * * * *